(12) United States Patent
Yamamoto

(10) Patent No.: US 10,134,369 B2
(45) Date of Patent: Nov. 20, 2018

(54) DRAWING CONTROL DEVICE

(71) Applicant: MITSUBISHI ELECTRIC CORPORATION, Tokyo (JP)

(72) Inventor: Shota Yamamoto, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 7 days.

(21) Appl. No.: 15/316,236

(22) PCT Filed: Sep. 26, 2014

(86) PCT No.: PCT/JP2014/075711
§ 371 (c)(1),
(2) Date: Dec. 5, 2016

(87) PCT Pub. No.: WO2016/046981
PCT Pub. Date: Mar. 31, 2016

(65) Prior Publication Data
US 2017/0200433 A1     Jul. 13, 2017

(51) Int. Cl.
*G09G 5/02* (2006.01)
*G09G 5/36* (2006.01)
(Continued)

(52) U.S. Cl.
CPC ............ *G09G 5/363* (2013.01); *B60K 35/00* (2013.01); *B60K 37/02* (2013.01); *G06T 11/203* (2013.01); *G06T 11/60* (2013.01); *G09G 5/10* (2013.01); *B60K 2350/1096* (2013.01); *B60K 2350/203* (2013.01); *B60K 2350/2069* (2013.01); *B60K 2350/352* (2013.01); *B60K 2350/402* (2013.01); *G09G 2320/08* (2013.01); *G09G 2380/10* (2013.01)

(58) Field of Classification Search
CPC .................. G09G 5/02; G06T 11/001
USPC .......................................... 345/589
See application file for complete search history.

(56) References Cited

U.S. PATENT DOCUMENTS

2005/0168330 A1* 8/2005 Ono ...................... B60K 35/00
340/461
2007/0078598 A1* 4/2007 Watanabe .............. B60K 37/02
701/429

(Continued)

FOREIGN PATENT DOCUMENTS

JP     2004-157434 A     6/2004
JP     2006-088971 A     4/2006

(Continued)

*Primary Examiner* — Jin Ge
(74) *Attorney, Agent, or Firm* — Birch, Stewart, Kolasch & Birch, LLP

(57) ABSTRACT

According to a drawing control device according to the present invention, graphics capable of implementing reality is displayed on a surface-shaped drawing device in a vehicle. A degree of importance is provided for each of components to be displayed (a drawing object, a drawing component and a decoration component), and the degree of importance is changed in accordance with the state of the vehicle. The drawing arrangement order is changed in accordance with the degree of importance to draw and display each of the components. As a result, the drawing control device can prevent any decoration component for pursuing reality from hiding information necessary to the driver from view.

13 Claims, 8 Drawing Sheets

(51) Int. Cl.
  *B60K 35/00*  (2006.01)
  *G06T 11/20*  (2006.01)
  *G06T 11/60*  (2006.01)
  *G09G 5/10*  (2006.01)
  *B60K 37/02*  (2006.01)

(56) References Cited

U.S. PATENT DOCUMENTS

| | | | |
|---|---|---|---|
| 2007/0085708 A1 | 4/2007 | Kato et al. | |
| 2007/0101290 A1* | 5/2007 | Nakashima | G01C 21/265 715/797 |
| 2007/0171142 A1* | 7/2007 | Ikarashi | B60K 35/00 345/4 |
| 2008/0211654 A1* | 9/2008 | Kasamatsu | B60K 35/00 340/461 |
| 2011/0090074 A1* | 4/2011 | Kuno | B60K 35/00 340/438 |
| 2011/0163864 A1* | 7/2011 | Watanabe | B60K 35/00 340/441 |
| 2011/0209092 A1* | 8/2011 | Tarte | B60K 35/00 715/830 |
| 2016/0001693 A1* | 1/2016 | Tamura | G01C 21/3632 340/441 |
| 2016/0224222 A1* | 8/2016 | Mori | B60K 35/00 |
| 2016/0236570 A1* | 8/2016 | Wakatsuki | B60K 35/00 |
| 2017/0109931 A1* | 4/2017 | Knorr | G06T 19/006 |
| 2017/0115846 A1* | 4/2017 | Motta | G06F 3/04815 |

FOREIGN PATENT DOCUMENTS

| | | |
|---|---|---|
| JP | 2007-099014 A | 4/2007 |
| JP | 2007-160995 A | 6/2007 |
| JP | 2008-168693 A | 7/2008 |
| JP | 2009-128308 A | 6/2009 |
| JP | 2009-137487 A | 6/2009 |
| JP | 2009-276943 A | 11/2009 |
| JP | 2010-023836 A | 2/2010 |
| JP | 2010-030575 A | 2/2010 |
| JP | 2010-058633 A | 3/2010 |
| JP | 2011-121544 A | 6/2011 |
| JP | 2014-213636 A | 11/2014 |

* cited by examiner

DRAWING CONTROL DEVICE

TECHNICAL FIELD

The present invention relates to a drawing control device that displays graphics on the instrument panel of a vehicle.

BACKGROUND ART

Conventionally, in a vehicle, various types of meters showing various pieces of information including the vehicle speed, the remaining amount of fuel and the number of revolutions of the engine are disposed. These meters are typically disposed in the instrument panel mounted in front of the driver's seat of the vehicle. In recent years, there are many cases in which in an instrument panel, such as a liquid crystal panel, having a surface-shaped drawing device, pieces of information about such meters as above are shown in graphic display.

In the surface-shaped drawing device, however, the following problems exist. Because on-screen meters are displayed in two dimensions, the driver cannot have a stereoscopic feeling for the on-screen meters and these meters do not look like actual meters. Further, even in a case where the on-screen meters are displayed in three dimensional representation, the driver feels unnatural because the shadow or the like resulting from light is not produced thereon.

In order to solve these problems, for example, in patent literatures 1 and 2, the following techniques for pursuing reality and representing the texture of actual analog meters or the like more accurately are disclosed. A light receiving sensor or the like is mounted on an instrument panel. The position and the incidence direction of received light are calculated based on the received light to draw shadow of the light or the like. As a result, the meters of a vehicle are displayed graphically in which the appearance thereof are closer to actual meters.

CITATION LIST

Patent Literature

Patent Literature 1: Japanese Unexamined Patent Application Publication No. 2009-276943
Patent Literature 2: Japanese Unexamined Patent Application Publication No. 2010-58633

SUMMARY OF INVENTION

Technical Problem

However, in conventional techniques disclosed in, for example, the patent literatures 1 and 2, the following problem exists: there is a possibility that a decoration, such as a shadow of a speedometer needle, for displaying a meter in an appearance more closely to an actual meter, blocks the display of important information, e.g., hides information required to drive the vehicle from view, and, as a result, the visibility of the information necessary to the driver is lowered. In addition, there is a problem that if the display screen freezes in the state where important information is blocked and only the display for decoration halts, the instrument panel remains in a state in which necessary information is hidden from view.

The present invention is made in order to solve the above-mentioned problems, and it is therefore an object of the present invention to provide a drawing control device that displays graphics capable of implementing reality on a surface-shaped display, and that can prevent a decoration component for pursuing reality from hiding information necessary to the driver from view.

Solution to Problem

In order to achieve the above-mentioned object, a drawing control device according to the present invention draws, on a surface-shaped drawing device in a vehicle, a drawing object, a drawing component within the drawing object, and either a decoration component for decorating the drawing object or a decoration component for decorating the drawing component. The drawing control device includes: a vehicle state acquirer to acquire information showing a state of the vehicle; and a controller to provide degrees of importance for the drawing object, the drawing component and the decoration component, which are to be drawn on the drawing device, in accordance with the vehicle state acquired by the vehicle state acquirer, and to also determine drawing arrangement order of the drawing object, the drawing component and the decoration component, which are to be drawn on the drawing device, in accordance with the degrees of importance. The controller changes the degrees of importance in accordance with a change of the vehicle state, and changes the drawing arrangement order of the drawing object, the drawing component and the decoration component, which are to be drawn on the drawing device, in accordance with the degrees of importance.

Advantageous Effects of Invention

In the drawing control device according to the present invention, graphics capable of implementing reality is displayed on a surface-shaped drawing device in the vehicle, and a degree of importance is provided for each of the components to be displayed (drawing objects, drawing components and decoration components), and the degree of importance is changed in accordance with the vehicle state and also the drawing arrangement order is changed in accordance with the degree of importance to draw and display each of the components. As a result, it is possible to prevent any decoration component for pursuing reality from hiding information necessary to the driver from view.

DESCRIPTION OF EMBODIMENTS

Hereafter, some embodiments of the present invention will be explained in detail with reference to the accompanying drawings.

A drawing control device according to the present invention displays graphics capable of implementing reality when displaying meters and so on used for a vehicle on a surface-shaped display (drawing device) in the vehicle, such as an instrument panel of the vehicle.

Embodiment 1

Figure 1:
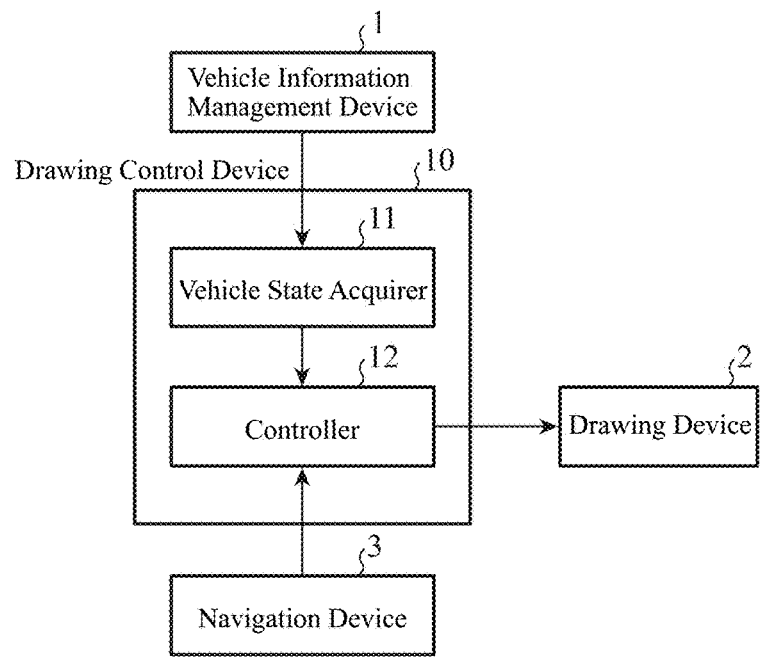
FIG. 1 is a block diagram showing an example of a drawing control device according to Embodiment 1.

FIG. 1 is a block diagram showing an example of a drawing control device according to Embodiment 1 of the present invention. This drawing control device 10 is connected to: a vehicle information management device 1 that manages the state of a vehicle such as the speed of the vehicle, the gear position, the remaining amount of fuel and warning information of the vehicle; a drawing device 2 on which data are drawn and displayed so that the driver can visually recognize the vehicle state and other information such as navigation information; and a navigation device 3. The drawing control device includes a vehicle state acquirer 11 and a controller 12.

The vehicle state acquirer 11 acquires information showing the vehicle state including the speed of the vehicle, the gear position, the remaining amount of fuel and warning information of the vehicle from the vehicle information management device 1 that manages the vehicle state including the speed of the vehicle, the gear position, the remaining amount of fuel and the warning information of the vehicle.

The controller 12 provides degrees of importance for pieces of drawing data to be drawn on the drawing device 2 (drawing objects, drawing components, and decoration components each for decorating a drawing object or decoration components each for decorating a drawing component) based on the vehicle state acquired by the vehicle state acquirer 11, and performs various control operations about drawing based on the above-mentioned degrees of importance, the various control operations including determination and change of the drawing positions and the drawing arrangement order of the pieces of drawing data (drawing objects, drawing components, and decoration components each for decorating a drawing object or decoration components each for decorating a drawing component) to be drawn on the drawing device 2, and determination of whether or not to display the pieces of drawing data. The details of the various control operations will be described later.

The drawing device 2 may be any type of device, such as a liquid crystal display, an organic electroluminescence display or a rear projection display, as long as the drawing device can draw and display drawing data. Further, a plurality of drawing devices can be disposed.

Further, although it is not necessary for the navigation device 3 to be connected to this drawing control device 10, when displaying a part of information which the navigation device has on the drawing device 2, the drawing control device 10 acquires the information to be displayed from the navigation device 3. Moreover, not only the navigation device having a route guidance function and so on, but also a device having a music reproduction function, a moving image reproduction function, or the like can be connected to the drawing control device, and information about those functions may also be displayed on the drawing device 2.

Figure 2:
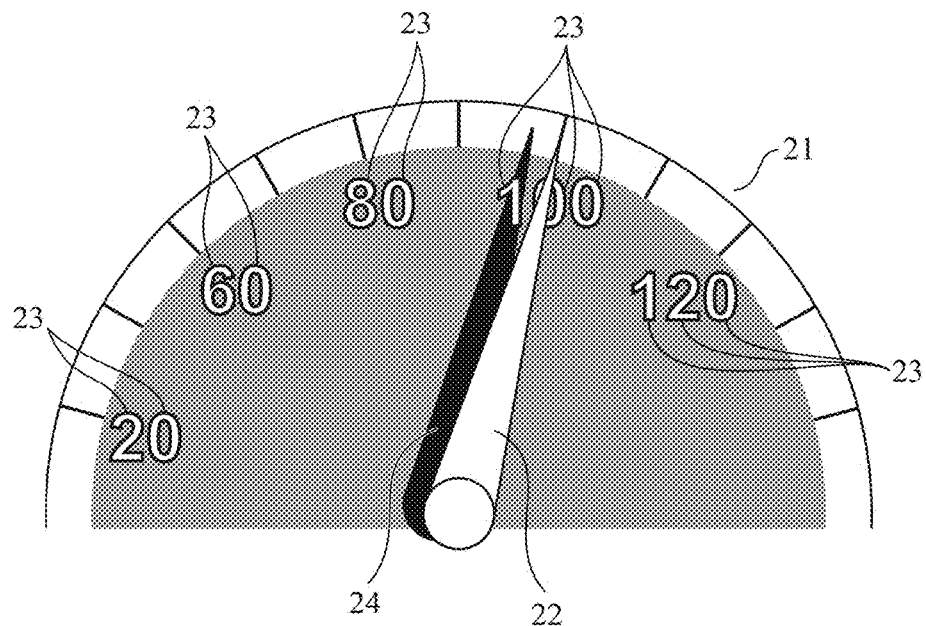
FIG. 2 is a diagram showing an example in which a speedometer (a drawing object), a speedometer needle (drawing component), speed indicating character strings (drawing components), and a speedometer needle shadow (a decoration component for decorating the speedometer needle (drawing component)) are drawn and displayed on a drawing device.

FIG. 2 is a diagram showing an example in which a speedometer (a drawing object) 21, a speedometer needle (a drawing component) 22, speed indicating character strings (drawing components) 23, and a speedometer needle shadow (a decoration component for decorating the speedometer needle (a drawing component) 22) 24 are drawn and displayed on the drawing device 2.

Here, a "drawing object" is drawing data having one meaning, such as a speedometer or a fuel gauge. Further, each of parts which construct each drawing object is called a "drawing component", and a component used for pursuing reality of a drawing object or a drawing component is called a "decoration component" (a decoration component for decorating a drawing object or a decoration component for decorating a drawing component).

In addition, "each component" indicates any of drawing objects, drawing components, and decoration components each for decorating a drawing component.

FIG. 2 shows a case in which a drawing object drawn and displayed on the drawing device 2 is a speedometer 21. In this case, the speedometer needle 22 and the speed indicating character strings 23 are drawn and displayed as drawing components in the speedometer (a drawing object) 21. Further, the speedometer needle shadow 24 is drawn and displayed as a decoration component for decorating the speedometer needle (a drawing component) 22.

Each component as above (each of those components such as a drawing object, drawing components and decoration component) is drawn by using three dimensional graphics. The speedometer needle shadow (a decoration component for decorating the speedometer needle (a drawing component) 22) 24 expresses an effect caused by light. In this example, this effect is a shadow of the speedometer needle (a drawing component) 22. This speedometer needle shadow (a decoration component for decorating the speedometer needle (a drawing component) 22) 24 can be drawn as one object, or can be drawn by performing an arithmetic operation based on a positional relationship between a set-up virtual light source and the speedometer needle (a drawing component) 22. In this Embodiment 1, the following explanation will be made by assuming that the speedometer needle shadow is drawn as one object.

The operation of the drawing control device 10 according to this Embodiment 1 will be explained concretely with reference to the flow charts shown in FIGS. 3 and 4.

Figure 3:
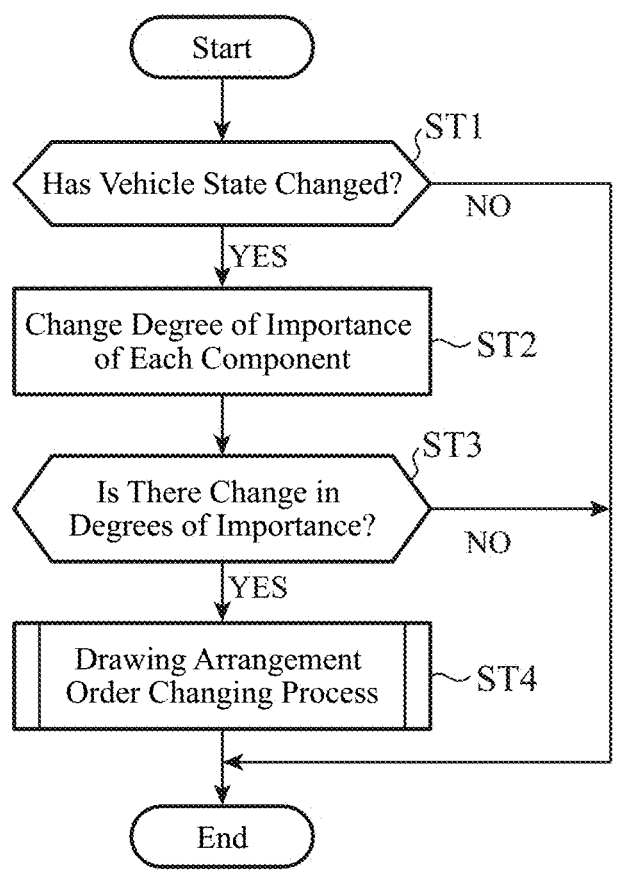
FIG. 3 is a flowchart showing an operation of the drawing control device according to Embodiment 1.

FIG. 3 is a flowchart showing the operation of the drawing control device 10 according to Embodiment 1.

The vehicle state acquirer 11 of the drawing control device 10 acquires the vehicle state (the speed of the vehicle, the gear position, the remaining amount of fuel, warning information of the vehicle, etc.) from the vehicle information management device 1. The controller 12 always monitors the vehicle state acquired by the vehicle state acquirer 11 and determines whether the vehicle state has changed (in step ST1).

When the vehicle state has not changed (NO in step ST1), the controller 12 ends the processing. In contrast, when the vehicle state has changed (YES in step ST1), the controller changes the degree of importance of each component (each of the components such as the drawing objects, the drawing components, and the decoration components each for decorating a drawing object, or the decoration components each for decorating a drawing component) based on the vehicle state (in step ST2). Namely, the controller changes the degree of importance of each component (such as a drawing object, drawing component, and a decoration component) in accordance with the vehicle state.

As a result, when the degree of importance of either of the components (the drawing objects, the drawing components and the decoration components each for decorating a drawing component) has changed (YES in step ST3), the controller 12 performs a process of changing the drawing arrangement order based on the degrees of importance of the components (in step ST4), and ends the processing.

In contrast, when the degree of importance of each component (the drawing objects, the drawing components and the decoration components each for decorating a drawing component) has not changed (NO in step ST3), the controller ends the processing without performing any further process.

The drawing arrangement order changing process in step ST4 will be explained concretely with reference to the flow chart shown in FIG. 4.

Figure 4:
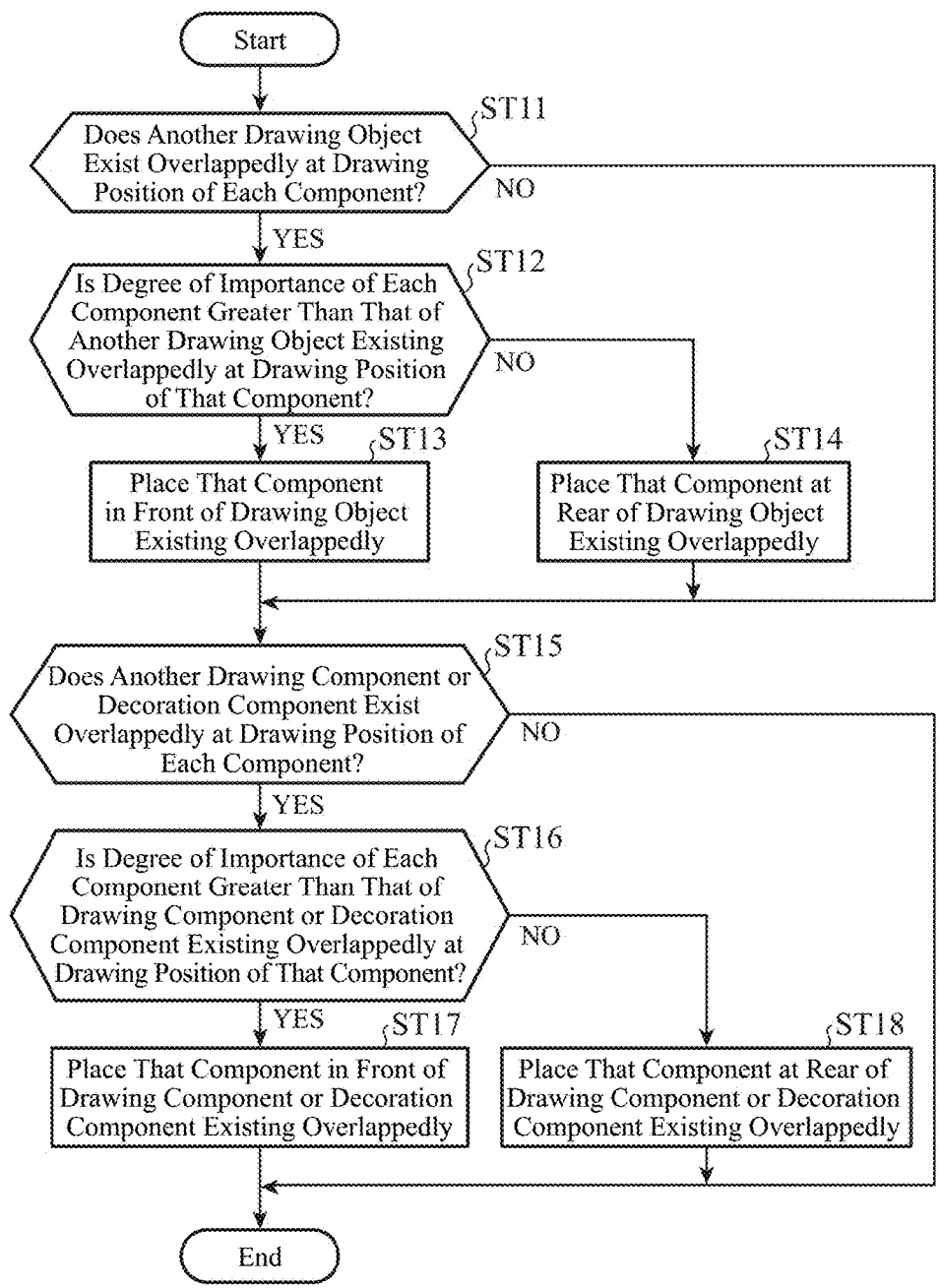
FIG. 4 is a flow chart showing a process of changing drawing arrangement order in the flow chart shown in FIG. 3.

FIG. 4 is a flow chart showing the drawing arrangement order changing process (in step ST4) in the flow chart shown in FIG. 3.

When the degree of importance of either of the components (the drawing objects, the drawing components and the decoration components each for decorating a drawing component) has changed in step ST3 of the flow chart shown in FIG. 3 (YES in step ST3), the drawing arrangement order changing process shown in FIG. 4 is started, and controller 12 determines for each component (each of the components including the drawing objects, the drawing components and the decoration components each for decorating a drawing component) whether another drawing object exists overlappedly at the drawing position of the component (in step ST11).

Next, when another drawing object exists overlappedly at the drawing position of a component (the drawing objects, the drawing components and the decoration components each for decorating a drawing component) (YES in step ST11), the controller 12 determines whether or not the degree of importance of the component (the drawing objects, the drawing components and the decoration components each for decorating a drawing component) is greater than that of the other drawing object existing overlappedly at the drawing position of the component (in step ST12).

When the degree of importance of the component (the drawing objects, the drawing components and the decoration components each for decorating a drawing component) is greater than that of the other drawing object existing overlappedly at the drawing position of the component (YES in step ST12), the controller 12 places the component (the drawing objects, the drawing components and the decoration components each for decorating a drawing component) in front of the other drawing object existing overlappedly at the drawing position of the component (in step ST13).

On the other hand, when the degree of importance of the component (the drawing objects, the drawing components and the decoration components each for decorating a drawing component) is less than or equal to that of the other drawing object existing overlappedly at the drawing position of the component (NO in step ST12), the controller 12 places the component (the drawing objects, the drawing components and the decoration components each for decorating a drawing component) at the rear of the other drawing object existing overlappedly at the drawing position of the component (in step ST14).

The controller 12 further determines, as to each component (the drawing objects, the drawing components and the decoration components each for decorating a drawing component), whether another drawing component or decoration component exists overlappedly at the drawing position of the component (in step ST15).

Next, when another drawing component or decoration component exists overlappedly at the drawing position of the component (the drawing objects, the drawing components and the decoration components each for decorating a drawing component) (YES in step ST15), the controller 12 determines whether or not the degree of importance of the component (the drawing objects, the drawing components and the decoration components each for decorating a drawing component) is greater than that of the other drawing component or decoration component existing overlappedly at the drawing position of the component (in step ST16).

When the degree of importance of the component (the drawing objects, the drawing components and the decoration components each for decorating a drawing component) is greater than that of the other drawing component or decoration component existing overlappedly at the drawing position of the component (YES in step ST16), the controller 12 places the component (the drawing objects, the drawing components and the decoration components each for decorating a drawing component) in front of the other drawing component or decoration component existing overlappedly at the drawing position of the component (in step ST17).

On the other hand, when the degree of importance of the component (the drawing objects, the drawing components and the decoration components each for decorating a drawing component) is less than or equal to that of the other drawing component or decoration component existing overlappedly at the drawing position of the component (NO in step ST16), the controller 12 places the component (the drawing objects, the drawing components and the decoration components each for decorating a drawing component) at the rear of the other drawing component or decoration component existing overlappedly at the drawing position of the component (in step ST18).

Hereafter, how the degrees of importance and the drawing arrangement order are changed will be explained concretely by taking, as an example, a case in which the speedometer (a drawing object) 21 is drawn and displayed on the drawing device 2.

FIG. 5 shows an example of drawing and display showing that the degrees of importance and the drawing arrangement order of the speedometer (a drawing object) 21, its drawing components 22 and 23, and the decoration component 24 are changed when the vehicle state changes from the one in which the vehicle is traveling at a speed of approximately 20 km/h to the one in which the vehicle is traveling at a speed of 100 km/h.

Figure 5A:
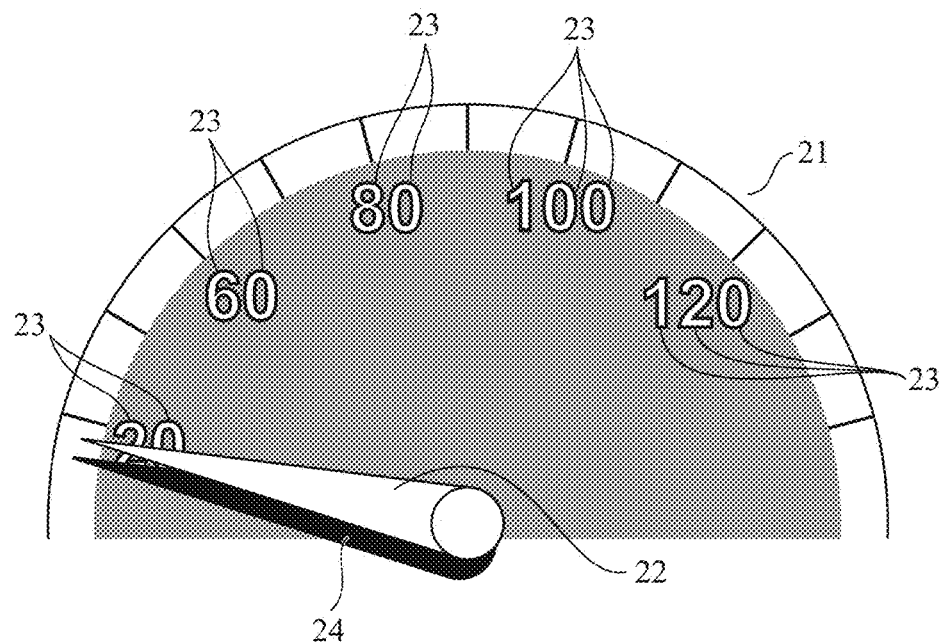
FIGS. 5A and 5B are diagrams of an example of drawing and display showing that the degrees of importance and the drawing arrangement order of the speedometer (a drawing object), its drawing components, and a decoration component are changed when a vehicle state changes from one in which a vehicle is traveling at a speed of approximately 20 km/h to one in which the vehicle is traveling at a speed of 100 km/h.

For example, FIG. 5A shows the speedometer (a drawing object) 21 which is drawn and displayed on the drawing device 2 in a state in which the vehicle is traveling along a general road at a speed of approximately 20 km/h.

Figure 5B:
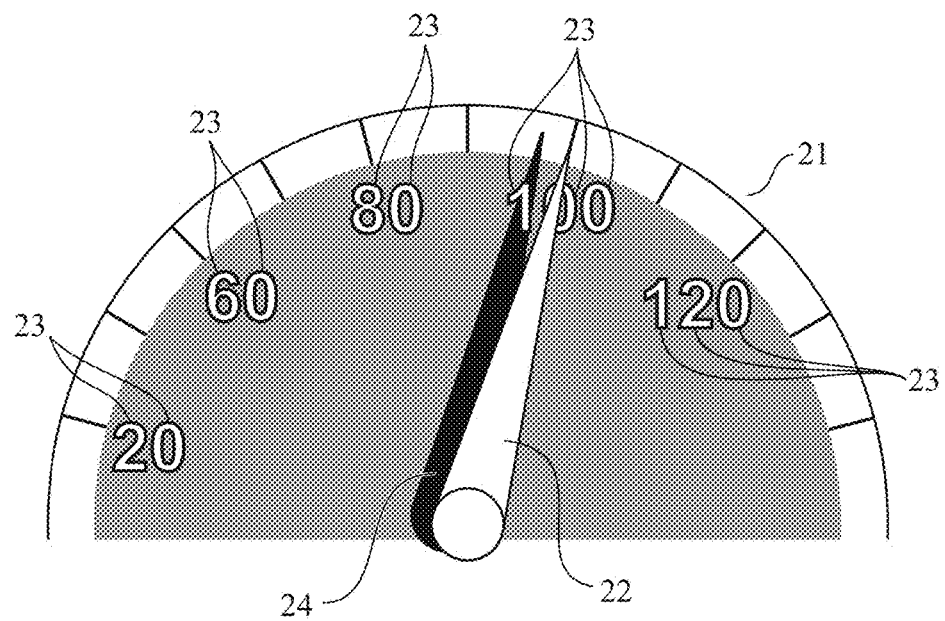

FIG. 5B shows the speedometer (a drawing object) 21 which is drawn and displayed on the drawing device 2 when the vehicle enters a traveling state in which the vehicle is traveling at a speed of 100 km/h, e.g. when the vehicle gradually speeds up from the above-mentioned state and runs into a highway. FIG. 5B shows the same example of drawing and display as that shown in FIG. 2.

Here, the threshold value with respect to the speed of the vehicle, at which the degrees of importance of the drawing object, the drawing components or the decoration component for decorating a drawing component is changed, is assumed to be 50 km/h.

It is further assumed that with respect to the speedometer (a drawing object) 21, the degree of importance of 0 is assigned when the vehicle is standing before the vehicle starts to travel or the like, the degree of importance of 70 is assigned when the vehicle speed is higher than 0 km/h and lower than 50 km/h, and the degree of importance of 100 is assigned when the vehicle speed is higher than or equal to 50 km/h.

It is further assumed that, with respect to the speedometer needle (a drawing component) 22, the degree of importance of 100 is always assigned when the vehicle speed is higher than 0 km/h. Namely, the degree of importance is not changeable for this drawing component (speedometer needle 22).

Further, it is further assumed that, with respect to the speed indicating character strings (drawing components) 23, the degree of importance of 40 is assigned when the vehicle speed is higher than 0 km/h and lower than 50 km/h, and the degree of importance of 80 is assigned when the vehicle speed is higher than or equal to 50 km/h. Namely, the degree of importance is changeable for these drawing components (speed indicating character strings 23).

Moreover, it is assumed that the degree of importance of the speedometer needle shadow (a decoration component for decorating the drawing component 22) 24 which is a decoration component for decorating the speedometer needle (a drawing component) 22 is always 50 when the vehicle speed is higher than 0 km/h.

This operation will be explained concretely with reference to the flow charts shown in FIGS. 3 and 4.

When the vehicle starts traveling and its speed becomes higher than 0 km/h, the controller 12 detects that the vehicle state has changed (YES in step ST1), and sets (changes) the degree of importance of the speedometer (a drawing object) 21 to 70, sets (changes) the degree of importance of the speedometer needle (a drawing component) 22 to 100, sets (changes) the degree of importance of the speed indicating character strings (drawing components) 23 to 40, and sets (changes) the degree of importance of the speedometer needle shadow (a decoration component for decorating the drawing component 22) 24 which is a decoration component for decorating the speedometer needle (a drawing component) 22 to 50 (in step ST2).

Since at least the degree of importance of the speedometer (a drawing object) 21 has been changed from 0 to 70 (YES in step ST3), the controller 12 performs the drawing arrangement order changing process (in step ST4 and FIG. 4).

At this time, the controller 12 determines, as to each component (the drawing object 21, the drawing components 22 and 23, and the decoration component 24 for decorating the drawing component 22), whether another drawing object exists overlappedly at the drawing position of the component (in step ST11), and then performs processes of step ST15 and subsequent steps because no other drawing object exists overlappedly at the drawing position of each component (the drawing object 21, the drawing components 22 and 23, and the decoration component 24 for decorating the drawing component 22) (NO in step ST11).

The controller 12 then determines, as to each component (the drawing object 21, the drawing components 22 and 23, and the decoration component 24 for decorating the drawing component 22), whether another drawing component or decoration component exists overlappedly at the drawing position of the component (in step ST15).

At this time, assuming that the vehicle is traveling slowly at a speed of approximately 20 km/h, because the speed indicating character string 23 of "20", which is another drawing component, exists overlappedly both at the drawing position of the speedometer needle (a drawing component) 22, and at the drawing position of the speedometer needle shadow (a decoration component for decorating the drawing component 22) 24 (YES in step ST15), the controller further determines whether or not the degree of importance of the speedometer needle (a drawing component) 22 and the degree of importance of the speedometer needle shadow (a decoration component for decorating the drawing component 22) 24 are greater than the degree of importance of the speed indicating character string 23 which is another drawing component existing overlappedly at the drawing positions of the speedometer needle and the speedometer needle shadow, respectively (in step ST16).

In this case, because the degree of importance of the speedometer needle (a drawing component) 22 is 100 and is greater than the degree of importance of 40 of the speed indicating character string 23 which is another drawing component existing overlappedly at the drawing position of the speedometer needle (YES in step ST16), the controller 12 places the speedometer needle (a drawing component) 22 in front of the speed indicating character string 23 which is another drawing component existing overlappedly at the drawing position of the speedometer needle (in step ST17).

Further, because the degree of importance of the speedometer needle shadow (a decoration component for decorating the drawing component 22) 24 is 50 and is greater than the degree of importance of 40 of the speed indicating character string 23 which is another drawing component existing overlappedly at the drawing position of the speedometer needle shadow (YES in step ST16), the controller 12 places the speedometer needle shadow (a decoration component for decorating the drawing component 22) 24 in front of the speed indicating character string 23 which is another drawing component existing overlappedly at the drawing position of the speedometer needle shadow (in step ST17).

As a result, as shown in FIG. 5A, the speed indicating character string 23 (a drawing component) whose degree of importance is 40 is drawn and displayed at the rear of the speedometer needle (a drawing component) 22 whose degree of importance is 100, and also at the rear of the speedometer needle shadow (a decoration component for decorating the speedometer needle (a drawing component) 22) 24 whose degree of importance is 50.

This is because, when the vehicle is traveling at a low speed of approximately 20 km/h, the information about the actual speed of the vehicle (speed indicating character string) is not so important for the driver, and therefore it is no problem even if the information is hidden from view by the speedometer needle (a drawing component) 22 or the speedometer needle shadow 24 which is a decoration component for decorating the speedometer needle (a drawing component) 22. Because the higher the degree of importance the more towards the front the component is placed, the speedometer needle (a drawing component) 22 whose degree of importance is 100 is drawn and shown frontmost.

After that, assuming that the vehicle runs into a highway and enters a traveling state in which the vehicle is traveling at a speed of 100 km/h as mentioned before, the controller 12 determines that the vehicle state has changed, and changes the degrees of importance of the drawing object, the drawing components, or the decoration component for decorating a drawing component. The concrete degrees of importance in this case are as follows. The degree of importance of the speedometer (a drawing object) 21 is 100, the degree of importance of the speedometer needle (a drawing component) 22 is 100, the degree of importance of the speed indicating character strings (a drawing components) 23 is 80, and the degree of importance of the speedometer needle shadow (a decoration component for decorating the drawing component 22) which is a decoration component for decorating the speedometer needle (a drawing component) 22 is 50.

Namely, since the vehicle state has changed from the one in which the vehicle is traveling at a speed of 20 km/h to the one in which the vehicle is traveling at a speed of 100 km/h, the controller 12 changes the degree of importance of the speed indicating character strings 23, which are drawing components whose degree of importance is changeable, from 40 to 80.

This operation will also be explained concretely with reference to the flow charts shown in FIGS. 3 and 4. At first, when the vehicle runs into a highway and starts traveling at a speed of approximately 100 km/h, the controller 12 detects that the vehicle state has changed (YES in step ST1), and sets (changes) the degree of importance of the speedometer (a drawing object) 21 to 100, sets (changes) the degree of importance of the speedometer needle (a drawing component) 22 to 100, sets (changes) the degree of importance of the speed indicating character strings (drawing components) 23 to 80, and sets (changes) the degree of importance of the speedometer needle shadow (a decoration component for decorating the drawing component 22) 24 which is a decoration component for decorating the speedometer needle (a drawing component) 22 to 50 (in step ST2).

Since at least the degree of importance of the speed indicating character strings (drawing components) 23 has been changed from 40 to 80 (YES in step ST3), the controller 12 performs the drawing arrangement order changing process (in step ST4 and FIG. 4).

At this time, the controller 12 determines, as to each component (each of the components including the drawing object 21, the drawing components 22 and 23, and the decoration component 24 for decorating the drawing component 22), whether another drawing object exists overlappedly at the drawing position of the component (in step ST11), and then performs processes of step ST15 and subsequent steps because no other drawing object exists overlappedly at the drawing position of any component (any of the components including the drawing object 21, the drawing components 22 and 23, and the decoration component 24 for decorating the drawing component 22) (NO in step ST11).

The controller 12 then determines, as to each component (each of the components including the drawing object 21, the drawing components 22 and 23, and the decoration component 24 for decorating the drawing component 22), whether another drawing component or decoration component exists overlappedly at the drawing position of the component (in step ST15). At this time, because the speed indicating character string 23 of "100", which is another drawing component, exists overlappedly both at the drawing position of the speedometer needle (a drawing component) 22, and at the drawing position of the speedometer needle shadow (a decoration component for decorating the drawing component 22) 24 (YES in step ST15), the controller further determines whether or not the degree of importance of the speedometer needle (a drawing component) 22 and the degree of importance of the speedometer needle shadow (a decoration component for decorating the drawing component 22) 24 are greater than the degree of importance of the speed indicating character string 23 which is another drawing component existing overlappedly at the drawing positions of the speedometer needle and the speedometer needle shadow, respectively (in step ST16).

In this case, because the degree of importance of the speedometer needle (a drawing component) 22 is 100 and is greater than the degree of importance of 80 of the speed indicating character string 23 which is another drawing component existing overlappedly at the drawing position of the speedometer needle (YES in step ST16), the controller 12 places the speedometer needle (a drawing component) 22 in front of the speed indicating character string 23 which is another drawing component existing overlappedly at the drawing position of the speedometer needle (in step ST17).

Further, because the degree of importance of the speedometer needle shadow (a decoration component for decorating the drawing component 22) 24 is 50 and is less than or equal to the degree of importance of 80 of the speed indicating character string 23 which is another drawing component existing overlappedly at the drawing position of the speedometer needle shadow (NO in step ST16), the controller 12 places the speedometer needle shadow (a decoration component for decorating the drawing component 22) 24 at the rear of the speed indicating character string 23 which is another drawing component existing overlappedly at the drawing position of the speedometer needle shadow (in step ST18).

As a result, as shown in FIG. 5B, the speed indicating character string 23 (a drawing component) whose degree of importance is 80 is drawn and displayed at the rear of the speedometer needle (a drawing component) 22 whose degree of importance is 100 and in front of the speedometer needle shadow (a decoration component for decorating the speedometer needle (a drawing component) 22) 24 whose degree of importance is 50, so that the speedometer needle shadow 24 which is a decoration component for decorating the speedometer needle (a drawing component) 22 is prevented from hiding the speed indicating character string (a drawing component) 23 which is information necessary to the driver from view.

As explained above, in the drawing control device 10 according to Embodiment 1 of the present invention, deteriorating of the visibility of the information required for the driver to drive the vehicle (in the above-mentioned case, the speed indicating character strings) caused by a decoration component for pursuing reality can be prevented, while maintaining drawings with reality.

A function of allowing the driver to voluntarily disable the display of each of all the decoration components can be added. This function can be adopted similarly for the following embodiments.

Further, in this Embodiment 1, the degree of importance of the speedometer needle 22 which is a drawing component is set to be not changeable, and to be 100. The degree of importance of the speedometer needle shadow 24 which is a decoration component for decorating the speedometer needle (a drawing component) 22 is set to be not changeable, and to be 50. The degree of importance of the speed indicating character strings 23 which are drawing components is set to be changeable and to be 40 when the vehicle speed is lower than 50 km/h and 80 when the vehicle speed is higher than or equal to 50 km/h, so that the degree of importance of the speed indicating character strings is changed in accordance with the vehicle speed (vehicle state). However, this embodiment is not limited to this example. For example, the following setting may be adopted. The degree of importance of the speed indicating character strings 23 which are drawing components is set to be not changeable and is fixed to 50. The degree of importance of the speedometer needle shadow, which is a decoration component for decorating the speedometer needle (a drawing component) 22, is set to be changeable in accordance with the vehicle speed (vehicle state) such that, for example, the degree of importance of the speedometer needle shadow 24 is set to be 80 when the vehicle speed is lower than 50 km/h and 40 when the vehicle speed is higher than or equal to 50 km/h.

Also in this case, it is preferable that when a plurality of components (drawing objects, drawing components and decoration components) exists at a same drawing position, the degrees of importance of components (drawing objects, the drawing components, and the decoration components) are compared with one another, and a component having a higher degree of importance is placed in front of any other components having a lower degree of importance.

In a case in which degrees of importance are provided for both the drawing objects, and the drawing components or the decoration components, it is preferable to make a comparison among the degrees of importance of the drawing objects first, and, after that, make a comparison among the degrees of importance of the drawing components or the decoration components, as shown in the flow chart of FIG. 4.

Further, although in this Embodiment 1 the example in which the speedometer is disposed as a drawing object is explained, this embodiment can be applied to any other drawing object, and criteria for changing the degree of importance can be set for each drawing object. For example, when a fuel gauge is disposed as a drawing object, the degree of importance can be changed in accordance with whether or not the remaining amount of fuel, which is defined as the vehicle state, is less than a predetermined threshold value. When a vehicle graphic is disposed as a drawing object, the degree of importance can be changed in accordance with whether or not warning information (e.g., a warning of a tire blowout) has been provided as the vehicle state.

As described above, because the drawing control device according to this Embodiment 1 displays graphics capable of implementing reality on a surface-shaped drawing device in the vehicle, and also provides a degree of importance for each displayed component (each of components including drawing objects, drawing components and decoration components), and changes the degree of importance in accordance with the vehicle state and also changes the drawing arrangement order in accordance with the degree of importance to draw and display each component, the drawing control device can prevent any decoration component for pursuing reality from hiding information necessary to the driver from view.

Embodiment 2

The block diagram showing an example of a drawing control device according to Embodiment 2 of the present invention is the same as that shown in FIG. 1 in Embodiment 1, so that the illustration and the explanation of the block diagram will be omitted here.

In Embodiment 1, a case where a decoration component decorates a drawing component is explained. In this Embodiment 2, a case where a decoration component decorates a drawing object will be explained.

FIG. 6 is a diagram showing an example in which a plurality of drawing objects (a vehicle graphic 31 and a fuel gauge 41) and a decoration component (vehicle graphic shadow) for decorating a drawing object are drawn and displayed on a drawing device 2.

More specifically, the vehicle graphic 31 and the fuel gauge 41 are displayed as drawing objects drawn and displayed on the drawing device 2, and a vehicle graphic shadow 32 is drawn and displayed on the drawing device 2 as a decoration component for decorating the vehicle graphic (a drawing object) 31.

Here, it is assumed that a threshold value about the remaining amount of vehicle fuel is 50%, and to the fuel gauge (a drawing object) 41, the degree of importance of 80 is assigned when the remaining amount of fuel is less than 50% and the degree of importance of 40 is assigned when the remaining amount of fuel is greater than or equal to 50%. It is further assumed that to the vehicle graphic (a drawing object) 31, the degree of importance of 0 is assigned when the vehicle is standing, e.g., before the vehicle starts to travel, and the degree of importance of 100 is assigned when the vehicle speed is higher than 0 km/h. To the vehicle graphic shadow 32 which is a decoration component for decorating the vehicle graphic (a drawing object) 31, the degree of importance of 0 is assigned when the vehicle is standing, e.g., before the vehicle starts to travel, and the degree of importance of 50 is assigned when the vehicle speed is higher than 0 km/h.

Each component as above (each of components including drawing objects, drawing components and decoration components) is drawn by using three dimensional graphics, like in the case of Embodiment 1. The vehicle graphic shadow (a decoration component for decorating the vehicle graphic (a drawing object) 31) 32 expresses an effect caused by light. In this example, this effect is a shadow of the vehicle graphic (a drawing object) 31. This vehicle graphic shadow (a decoration component for decorating the vehicle graphic (a drawing object) 31) 32 can be drawn as one object, or can be drawn by performing an arithmetic operation based on a positional relationship between a set-up virtual light source and the vehicle graphic (a drawing object) 31. Also in this Embodiment 2, the following explanation will be made by assuming that the vehicle graphic shadow is drawn as one object.

The operation of the drawing control device 10 according to this Embodiment 2 will be explained concretely with reference to the flow charts shown in FIGS. 3 and 4 which are the same as those used in the explanation in Embodiment 1.

When the vehicle starts to travel with a full load of fuel and the speed of the vehicle becomes higher than 0 km/h, the controller 12 detects first that the vehicle state has changed (YES in step ST1), and sets (changes) the degree of importance of the vehicle graphic (a drawing object) 31 to 100, sets (changes) the degree of importance of the vehicle graphic shadow 32 which is a decoration component for decorating the vehicle graphic (a drawing object) 31 to 50, and sets (changes) the degree of importance of the fuel gauge (a drawing object) 41 to 40 (in step ST2).

Since at least the degree of importance of the vehicle graphic (a drawing object) 31 has been changed from 0 to 100 (YES in step ST3), the controller 12 performs a process of changing drawing arrangement order (in step ST4 and FIG. 4).

In this process, the controller 12 determines, as to each component (each of the components including the drawing objects 31 and 41, and the decoration component 32 for decorating the drawing object 31), whether another drawing object exists overlappedly at the drawing position of the component (in step ST11).

At this time, because the fuel gauge 41, which is another drawing object, exists overlappedly at the drawing position of the vehicle graphic shadow 32 which is a decoration component for decorating the vehicle graphic (a drawing object) 31 (YES in step ST11), the controller 12 further determines whether or not the degree of importance of the vehicle graphic shadow 32 which is a decoration component for decorating the vehicle graphic (a drawing object) 31 is greater than that of the fuel gauge 41 which is another drawing object existing overlappedly at the drawing position of the vehicle graphic shadow (in step ST12).

Then, because the degree of importance of the vehicle graphic shadow (a decoration component for decorating the drawing object 31) 32 is 50 and is greater than the degree of importance of 40 of the fuel gauge 41 which is another drawing object existing overlappedly at the drawing position of the vehicle graphic shadow (YES in step ST12), the controller 12 places the vehicle graphic shadow (a decoration component for decorating the drawing object 31) 32 in front of the fuel gauge 41 which is another drawing object existing overlappedly at the drawing position of the vehicle graphic shadow (in step ST13).

The controller 12 then determines, as to each component (each of the components including the drawing objects 31 and 41, and the decoration component 32 for decorating the drawing object 31), whether or not another drawing component or decoration component exists overlappedly at the drawing position of the component (in step ST15), and, because no other drawing component or decoration component exists overlappedly at the drawing position of any component (any of the components including the drawing objects 31 and 41, and the decoration component 32 for decorating the drawing object 31) (NO in step ST15), ends this processing here.

Figure 6A:
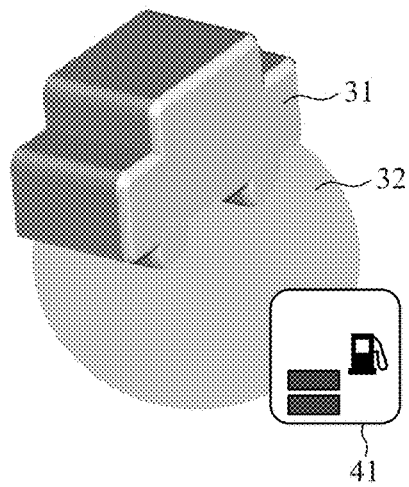
FIGS. 6A and 6B are diagrams showing an example in which a plurality of drawing objects (a vehicle graphic and a fuel gauge) and a decoration component (vehicle graphic shadow) for decorating a drawing object are drawn and displayed on a drawing device.
Figure 6B:
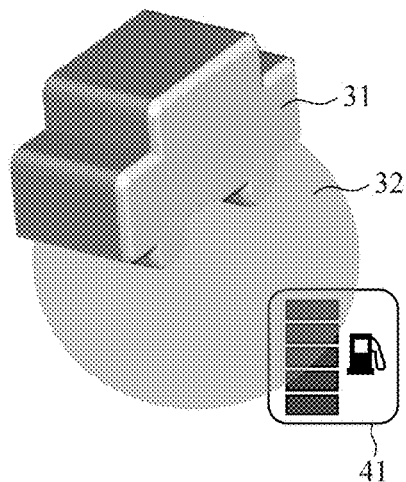

As a result, as shown in FIG. 6B, the fuel gauge (a drawing object) 41 whose degree of importance is 40 is drawn and displayed at the rear of the vehicle graphic shadow (a decoration component for decorating the vehicle graphic (a drawing object) 31) 32 whose degree of importance is 50. This is because the remaining amount of vehicle fuel is large, and therefore the fuel gauge (a drawing object) 41 that displays the remaining amount of fuel is not so important information for the driver. Because the higher the degree of importance the more towards the front the component is placed, the vehicle graphic (a drawing object) 31 whose degree of importance is 100 is drawn and displayed frontmost.

Assuming that after that, the vehicle continues traveling and the remaining amount of vehicle fuel becomes 40%, the controller 12 determines that the vehicle state has changed, and changes the degree of importance of each component (each of the components including the drawing objects, the drawing components, and the decoration components each for decorating a drawing object or the decoration components each for decorating a drawing component). The concrete degrees of importance in this case are as follows. The degree of importance of the vehicle graphic (a drawing object) 31 is 100, the degree of importance of the vehicle graphic shadow 32 which is a decoration component for decorating the vehicle graphic (a drawing object) 31 is 50, and the degree of importance of the fuel gauge (a drawing object) 41 is 80.

This operation will also be explained concretely with reference to the flow charts shown in FIGS. 3 and 4.

At first, when the vehicle continues traveling and the remaining amount of vehicle fuel becomes 50% or less, the controller 12 detects that the vehicle state has changed (YES in step ST1), and sets (changes) the degree of importance of the vehicle graphic (a drawing object) 31 to 100, sets (changes) the degree of importance of the vehicle graphic shadow 32 which is a decoration component for decorating the vehicle graphic (a drawing object) 31 to 50, and sets (changes) the degree of importance of the fuel gauge (a drawing object) 41 to 80 (in step ST2).

Since at least the degree of importance of the fuel gauge (a drawing object) 41 has been changed from 40 to 80 (YES in step ST3), the controller 12 performs the drawing arrangement order changing process (in step ST4 and FIG. 4).

In this process, the controller 12 determines, as to each component (each of the components including the drawing objects 31 and 41, and the decoration component 32 for decorating the drawing object 31), whether another drawing object exists overlappedly at the drawing position of the component (in step ST11).

At this time, because the fuel gauge 41, which is another drawing object, exists overlappedly at the drawing position of the vehicle graphic shadow 32 which is a decoration component for decorating the vehicle graphic (a drawing object) 31 (YES in step ST11), it is further determined whether or not the degree of importance of the vehicle graphic shadow 32 which is a decoration component for decorating the vehicle graphic (a drawing object) 31 is greater than that of the fuel gauge 41 which is another drawing object existing overlappedly at the drawing position of the vehicle graphic shadow (in step ST12).

Then, because the degree of importance of the vehicle graphic shadow (a decoration component for decorating the drawing object 31) 32 is 50 and is less than or equal to the degree of importance of 80 of the fuel gauge 41 which is another drawing object existing overlappedly at the drawing position of the vehicle graphic shadow (NO in step ST12), the controller 12 places the vehicle graphic shadow (a decoration component for decorating the drawing object 31) 32 at the rear of the fuel gauge 41 which is another drawing object existing overlappedly at the drawing position of the vehicle graphic shadow (in step ST14).

The controller 12 then determines, as to each component (each of the components including the drawing objects 31 and 41, and the decoration component 32 for decorating the drawing object 31), whether or not another drawing component or decoration component exists overlappedly at the drawing position of the component (in step ST15), and, because no other drawing component or decoration component exists overlappedly at the drawing position of any component (any of the components including the drawing objects 31 and 41, and the decoration component 32 for decorating the drawing object 31) (NO in step ST15), ends this processing here.

As a result, as shown in FIG. 6A, the fuel gauge (a drawing object) 41 whose degree of importance is 80 is drawn and displayed in front of the vehicle graphic shadow (a decoration component for decorating the vehicle graphic (a drawing object) 31) 32 whose degree of importance is 50, so that the vehicle graphic shadow 32 which is a decoration component for decorating the vehicle graphic (a drawing object) 31 is prevented from hiding the fuel gauge (a drawing object) 41 which is information necessary to the driver from view.

As described above, also similarly in the drawing control device 10 according to Embodiment 2 of the present invention, it is possible to prevent any decoration component for pursuing reality from deteriorating the visibility of information required for the driver to drive the vehicle (in the above-mentioned case, the fuel gauge), while maintaining drawings with reality.

In this Embodiment 2, the degree of importance of the vehicle graphic 31 which is a drawing object is set to 100, the degree of importance of the vehicle graphic shadow 32 which is a decoration component for decorating the vehicle graphic (a drawing object) 31 is set to 50, and the degree of importance of the fuel gauge 41 which is another drawing object is changed in accordance with the remaining amount of fuel in such a way that it is set to 80 when the remaining amount of fuel is less than 50% and is set to 40 when the remaining amount of fuel is greater than or equal to 50%. However, this embodiment is not limited to this example. For example, the degree of importance of the fuel gauge 41 which is a drawing object is fixed to 50, and the degree of importance of the vehicle graphic shadow 32 which is a decoration component for decorating the vehicle graphic (a drawing object) 31 may be changeable in accordance with the remaining amount of fuel in such a way that it is set to 40 when the remaining amount of fuel is less than 50% and is set to 80 when the remaining amount of fuel is greater than or equal to 50%.

Also in this case, it is preferable that when a plurality of components (including drawing objects, drawing components and decoration components) exist at the same drawing position, the degrees of importance of the components (including the drawing objects, the drawing components, and the decoration components) are compared with one another, and a component having a higher degree of importance is placed in front of any other components having a lower degree of importance.

In a case in which degrees of importance are provided for both the drawing objects, and the drawing components or the decoration components, it is preferable to make a comparison among the degrees of importance of the drawing objects first, and, after that, make a comparison among the degrees of importance of the drawing components or the decoration components, as shown in the flow chart of FIG. 4.

Further, although in Embodiment 2, the example in which the vehicle graphic and the fuel gauge are provided as drawing objects is explained, this embodiment can be applied to any other drawing object, and criteria for changing the degree of importance can be set for each drawing object.

As described above, because the drawing control device according to this Embodiment 2 displays graphics capable of implementing reality on a surface-shaped drawing device in the vehicle, and also provides a degree of importance for each component to be displayed (each of components including drawing objects, drawing components and decoration components), and changes the degree of importance in accordance with the vehicle state and also changes the drawing arrangement order in accordance with the degree of importance to draw and display each component, the drawing control device can prevent any decoration component for pursuing reality from hiding information necessary to the driver from view.

Embodiment 3

Figure 7:
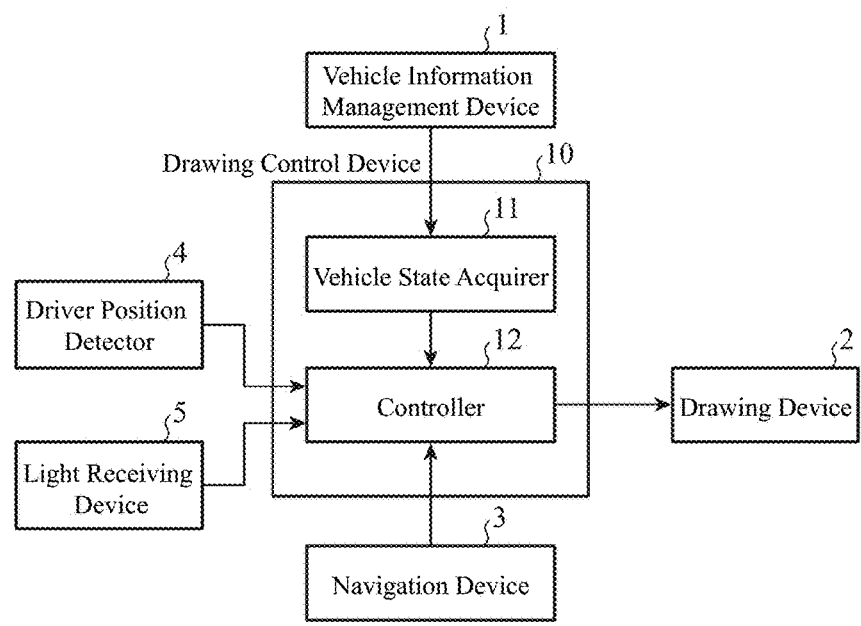
FIG. 7 is a block diagram showing an example of a drawing control device according to Embodiment 3.

FIG. 7 is a block diagram showing an example of a drawing control device 10 according to Embodiment 3 of the present invention. The same components as those explained in Embodiment 1 are denoted by the same reference numerals, and the duplicated explanation of the components will be omitted hereafter.

The basic operation of the drawing control device 10 according to this Embodiment 3 is the same as those of the drawing control devices according to Embodiments 1 and 2. In addition, a driver position detector 4 and a light receiving device 5 are also connected to the drawing control device 10. The drawing control device draws and displays a decoration component for pursuing reality in a form in which the decoration component looks like an actual thing more closely, in accordance with: the relative position between the driver's position and each component (each of components including drawing objects, drawing components and decoration components) drawn on a drawing device 2; and the direction and intensity, etc. of light received (radiated) from outside the drawing control device.

The driver position detector 4 detects the relative position between the driver of the vehicle and each component (each of the components including the drawing objects, the drawing components and the decoration components) drawn on the drawing device 2, and a line-of-sight detection sensor using infrared light, a camera or the like can be used for this driver position detector. Alternatively, the driver position detector can determine the relative position by performing an arithmetic operation based on the vehicle driver's seat position and the installation position of the drawing device 2, using vehicle type information or the like acquired via CAN communications or the like.

Further, the light receiving device 5 detects the intensity of illumination, the direction of radiation, etc. of light radiated toward the drawing device 2 from outside the drawing control device, and a light receiving sensor or the like can be used for this light receiving device.

Figure 8:
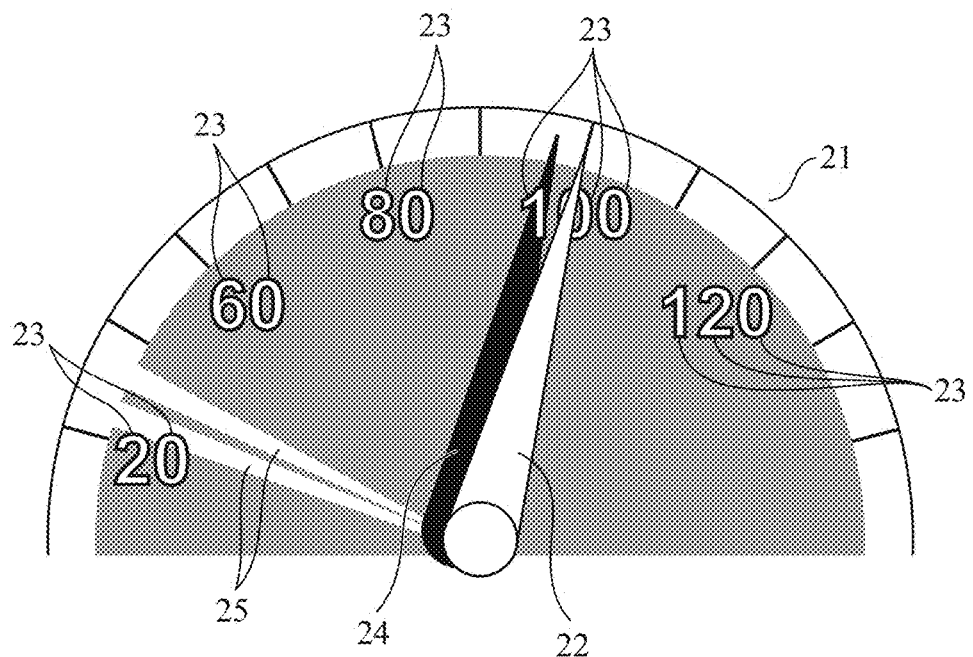
FIG. 8 is a diagram showing an example in which a speedometer (a drawing object), a speedometer needle (drawing component), speed indicating character strings (drawing components), a speedometer needle shadow (a decoration component for decorating the speedometer needle (drawing component)), and reflected light beams (decoration components for decorating the speedometer needle (drawing component)) are drawn and displayed on a drawing device.

FIG. 8 is a diagram showing an example in which a speedometer (a drawing object) 21, a speedometer needle (a drawing component) 22, speed indicating character strings (a drawing components) 23, a speedometer needle shadow (a decoration component for decorating the speedometer needle (a drawing component) 22) 24, and reflected light beams (decoration components each for decorating the speedometer needle (a drawing component) 22) 25 are drawn and displayed on the drawing device 2.

In FIGS. 2 and 5 in Embodiment 1, as a decoration component for decorating the speedometer needle 22 which is a drawing component, only the speedometer needle shadow 24 indicating a shadow of the speedometer needle (a drawing component) 22 is provided as an object to express an effect caused by light. In addition, as shown in FIG. 8, the reflected light beams 25 may also be drawn as decoration components for decorating the speedometer needle (a drawing component) 22. Namely, as components expressing an effect caused by light, not only a shadow of the speedometer needle (a drawing component) 22, but also a component to increase the brightness of a portion which is assumed to be exposed to light can be provided.

At this time, instead of drawing each of the following components: the speedometer needle shadow 24 and the reflected light beams 25 which are decoration components for decorating the speedometer needle (a drawing component) 22 as one object, by drawing them in accordance with the direction of radiation of the light detected by the light receiving device 5, the position at which the speedometer needle shadow 24 is displayed can be made to get close to an actual position, and the reflected light beams 25 can be displayed in a state in which their positions and brightness are closer to actual positions and actual brightness.

Here, it is assumed that, similarly to the case of the example explained using FIG. 5 in Embodiment 1, the following setting is assumed. To the speedometer needle (a drawing component) 22, the degree of importance of 100 is always assigned when the vehicle speed is higher than 0 km/h. To the speed indicating character strings (drawing components) 23, the degree of importance of 40 is assigned when the vehicle speed is higher than 0 km/h and lower than 50 km/h and the degree of importance of 80 is assigned when the vehicle speed is higher than or equal to 50 km/h. To the speedometer needle shadow (a decoration component for decorating the drawing component 22) which is a decoration component for decorating the speedometer needle (a drawing component) 22, the degree of importance of 50 is always assigned when the vehicle speed is higher than 0 km/h. It is further assumed that, to the reflected light beams 25 which are decoration components for decorating the speedometer needle (a drawing component) 22, the degree of importance of 30 is always assigned when the vehicle speed is higher than 0 km/h.

As a result, because the degree of importance (50) of the speedometer needle shadow (a decoration component for decorating the drawing component 22) 24 which is a decoration component for decorating the speedometer needle (a drawing component) 22 is greater than that (30) of the reflected light beams 25 which are other decoration components existing overlappedly at the drawing position of the speedometer needle shadow, the speedometer needle shadow 24 is placed in front of the reflected light beams 25. Further, because the degree of importance of the speed indicating character strings (drawing components) 23 (the degree of importance is 40 when the vehicle speed is higher than 0 km/h and lower than 50 km/h and is 80 when the vehicle speed is higher than or equal to 50 km/h) is also greater than that (30) of the reflected light beams 25 which are other decoration components existing overlappedly at the drawing position of one speed indicating character string, the speed indicating character string 23 is placed in front of the reflected light beams 25.

Further, the controller 12 can be configured so as to change the darkness of the shadow when acquiring change information about the darkness of the shadow. Assuming that, for example, the change information about the darkness of the shadow is the intensity of illumination received by the light receiving device 5, the controller can change the depth of the color of the speedometer needle shadow 24 in accordance with the intensity of illumination of the light detected by the light receiving device 5. For example, the controller increases the depth of the color of the speedometer needle shadow 24 when the intensity of illumination is high, and decreases the depth of the color of the speedometer needle shadow 24 when the intensity of illumination is low. As an alternative, the controller can allow the driver of the vehicle to set the depth of the color of the speedometer needle shadow to a voluntary one.

Figure 9:
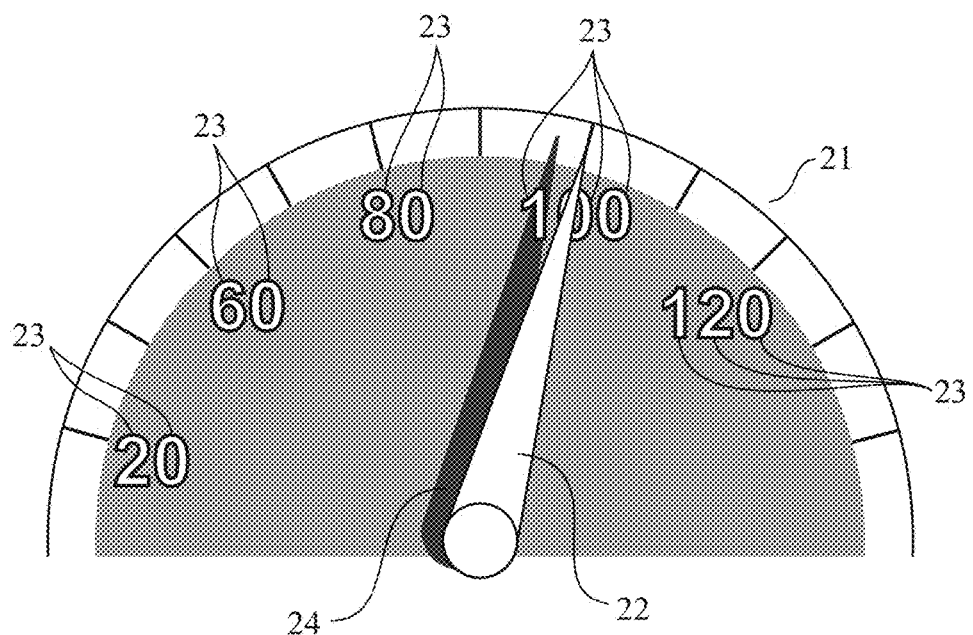
FIG. 9 is a diagram showing a state in which the speedometer needle shadow (a decoration component for decorating the speedometer needle (drawing component)) is displayed in light color in the example in which the speedometer (a drawing object), the speedometer needle (drawing component), the speed indicating character strings (drawing components), and the speedometer needle shadow (a decoration component for decorating the speedometer needle (drawing component)) are drawn and displayed on the drawing device.

FIG. 9 is a diagram showing a state in which the speedometer needle shadow (a decoration component for decorating the speedometer needle (a drawing component)) 24 is displayed in light color in the example in which the speedometer (a drawing object) 21, the speedometer needle (a drawing component) 22, the speed indicating character strings (drawing components) 23, and the speedometer needle shadow (a decoration component for decorating the speedometer needle (a drawing component) 22) 24 are drawn and displayed on the drawing device 2.

Further, when decoration components are controlled by using a virtual light source, a plurality of light sources are used for decorating one drawing component. In such a case, a plurality of decoration components is disposed for decorating one drawing component, as shown in, for example, FIG. 10. Namely, a plurality of light sources can be disposed, and the controller 12 can be configured so as to draw multiple shadows in accordance with the number of light sources.

Figure 10:
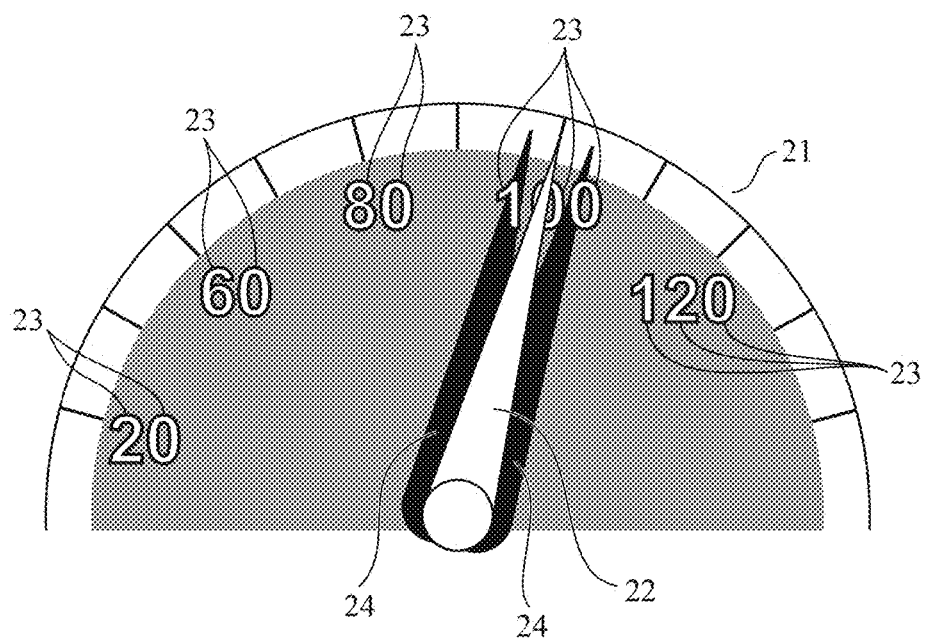
FIG. 10 is a diagram showing an example in which the speedometer (a drawing object), the speedometer needle (drawing component), the speed indicating character strings (drawing component), and a plurality of speedometer needle shadows (decoration components for decorating the speedometer needle (drawing component)) are drawn and displayed on the drawing device.

FIG. 10 is a diagram showing an example in which the speedometer (a drawing object) 21, the speedometer needle (a drawing component) 22, the speed indicating character strings (a drawing component) 23, and a plurality of speedometer needle shadows (decoration components for decorating the speedometer needle (a drawing component) 22) 24 are drawn and displayed on the drawing device 2.

When controlling a decoration component by using a virtual light source, the position of the light source can be changed as required. Namely, the position of the light source is movable, and the controller 12 may draw a shadow in accordance with the position of the movable light source.

The controller 12 can also calculate (estimate) the position of the sun from both the position information about the self vehicle, which is acquired using GPS, and a time zone, and draw and display a decoration component based on the calculated position of the sun. More specifically, a light source can be placed in a direction in which the sun is estimated to be currently located in accordance with the position and the traveling direction of the vehicle. The estimation of the position of the sun can be performed by the controller 12 or an external arithmetic device. When the estimation is performed by an external arithmetic device, the position of the sun can be notified to the controller 12.

When drawing based on the position of the sun is adopted, the position of the light source can be fixed during the night. More specifically, during the night, the light source can be placed at a predetermined position and the controller 12 can draw a shadow in accordance with the position of the light source.

Further, the controller 12 can change the drawing position of a decoration component in accordance with the relative position between the driver's position (eyepoint) detected by the driver position detector 4, and the drawing position of each component (each of the components including the drawing objects, the drawing components and the decoration components) drawn and displayed on the drawing device 2.

FIG. 11 is a diagram showing an example in which the drawing position of the speedometer needle shadow (a decoration component for decorating the speedometer needle (a drawing component) 22) 24 drawn and displayed on the drawing device 2 is changed in accordance with the driver's position (eyepoint).

Figure 11A:
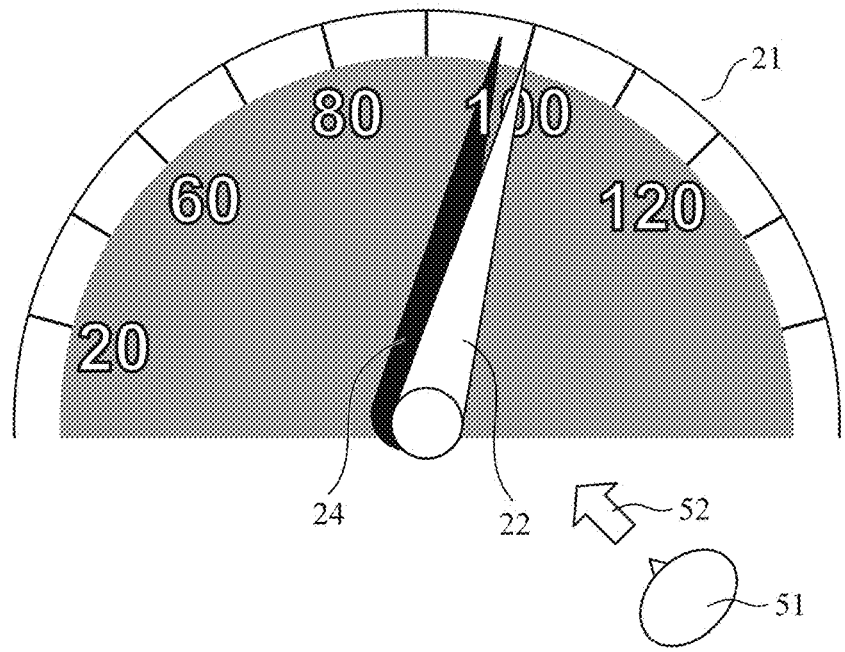
FIGS. 11A and 11B are diagrams showing an example in which the drawing position of the speedometer needle shadow (a decoration component for decorating the speedometer needle (drawing component)) drawn and displayed on the drawing device is changed in accordance with the driver's position (the eyepoint).

FIG. 11A shows a display example with a positional relationship in which the driver 51 of the vehicle visually recognizes the speedometer (a drawing object) 21 displayed on the drawing device 2 from a slightly rightward direction, e.g., the driver 51 of the vehicle is sitting in front of the instrument panel, with the speedometer 21 being displayed on, for example, a left-hand side portion of the instrument panel, i.e., a left-hand side portion of the drawing device 2.

In the case of the positional relationship as shown in this FIG. 11A, because the driver's line of sight is in a state in which the driver visually recognizes the speedometer (a drawing object) 21 from a slightly rightward direction shown by the arrow 52 in the figure, it is natural that the speedometer needle shadow (a decoration component for decorating the speedometer needle (a drawing component) 22) 24 is displayed to the left of the speedometer needle (a drawing component) 22.

Figure 11B:
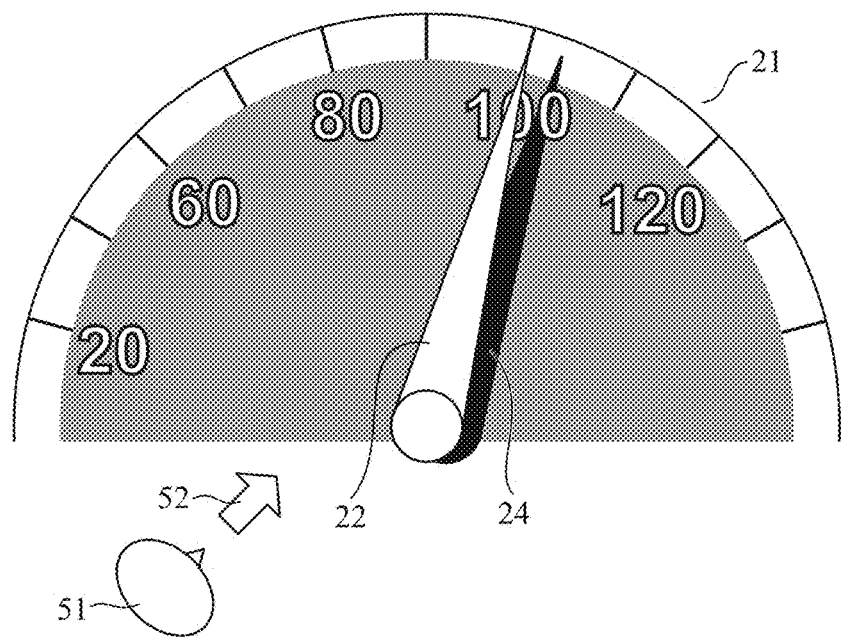

Further, FIG. 11B shows a display example with a positional relationship in which the driver 51 of the vehicle visually recognizes the speedometer (a drawing object) 21 displayed on the drawing device 2 from a slightly leftward direction, e.g., the driver 51 of the vehicle is sitting in front of the instrument panel, with the speedometer 21 being displayed on, for example, a right-hand side portion of the instrument panel, i.e., a right-hand side portion of the drawing device 2.

In the case of the positional relationship as shown in this FIG. 11B, because the driver's line of sight is in a state in which the driver visually recognizes the speedometer (a drawing object) 21 from a slightly leftward direction shown by the arrow 52 in the figure, it is natural that the speedometer needle shadow (a decoration component for decorating the speedometer needle (a drawing component) 22) 24 is displayed to the right of the speedometer needle (a drawing component) 22.

In the cases where the display position of the speedometer (a drawing object) 21 displayed on the drawing device 2 is moved, or the position of the driver 51 is changed, the positional relationship between each component (each of the components including the drawing objects, the drawing components and the decoration components) displayed on the drawing device 2, and the driver 51 of the vehicle changes in accordance with the direction of the movement of the display position or the change of the position of the driver. Namely, in accordance with the change, for example, the drawing position of the speedometer needle shadow (a decoration component for decorating the speedometer needle (a drawing component) 22) 24 drawn and displayed on the drawing device 2 is changed, as shown in FIG. 11A or FIG. 11B.

By thus changing the position of a decoration component in accordance with the relative position of the eyepoint of the driver of the vehicle and the drawing position of each component (each of the components including the drawing objects, the drawing components and the decoration components) drawn on the drawing device 2, when the driver's eyepoint is changed and the relative position between the driver's eyepoint and the drawing position of each component drawn is changed, the drawing control device can perform drawing pursuing more reality by drawing the decoration component in accordance with the new relative position.

Further, also in a case where the drawing position of each component is changed and the relative position between the driver's eyepoint and the drawing position of each component drawn is changed, by drawing the decoration component in accordance with the new relative position, the drawing control device can perform drawing pursuing more reality.

As described above, because the drawing control device according to this Embodiment 3 changes the position of a decoration component in accordance with the relative position between the eyepoint of the driver of the vehicle, and the drawing position of each component (each of components including drawing objects, drawing components and decoration components) drawn on the drawing device 2, when the relative position between the driver's eyepoint and the drawing position of each component drawn is changed, the drawing control device can perform drawing pursuing more reality by drawing the decoration component in accordance with the new relative position, in addition to the advantages provided by Embodiments 1 and 2.

While the invention has been described in its preferred embodiments, it is to be understood that any combination of two or more of the above-mentioned embodiments can be made, various changes can be made in any component in accordance with any one of the above-mentioned embodiments, and any component in any one of the above-mentioned embodiments can be omitted within the scope of the invention.

INDUSTRIAL APPLICABILITY

The drawing control device according to the present invention is applied to a drawing device that displays graphics capable of implementing reality when displaying the meters of a vehicle and so on on a surface-shaped display (drawing device) in the vehicle, such as the instrument panel of the vehicle.

REFERENCE SIGNS LIST

1: vehicle information management device, 2: drawing device, 3: navigation device, 4: driver position detector, 5: light receiving device, 10: drawing control device, 11: vehicle state acquirer, 12: controller, 21: speedometer (a drawing object), 22: speedometer needle (a drawing component in speedometer (a drawing object) 21), 23: speed indicating character string (a drawing component in speedometer (a drawing object) 21), 24: speedometer needle shadow (a decoration component for decorating speedometer needle (a drawing component) 22), 25: reflected light beam (a decoration component for decorating speedometer needle (a drawing component) 22), 31: vehicle graphic (a drawing object), 32: vehicle graphic shadow (a decoration component for decorating vehicle graphic (a drawing object) 31), 41: fuel gauge, 51: driver, and 52: arrow showing direction of driver's line of sight.

The invention claimed is:

1. A drawing control device that draws, on a surface-shaped drawing device in a vehicle, a drawing object, a drawing component within said drawing object, and either a decoration component for decorating said drawing object or a decoration component for decorating said drawing component, said drawing control device comprising:
- a vehicle state acquirer to acquire information showing a state of said vehicle; and
- a controller to provide degrees of importance for said drawing object, said drawing component and said decoration component, which are to be drawn on said drawing device, in accordance with the vehicle state acquired by said vehicle state acquirer, and to also determine drawing arrangement order of said drawing object, said drawing component and said decoration component, which are to be drawn on said drawing device, in accordance with said degrees of importance, wherein said controller changes said degrees of importance in accordance with a change of said vehicle state, and changes the drawing arrangement order of said drawing object, said drawing component and said decoration component, which are to be drawn on said drawing device, in accordance with said degrees of importance, wherein said drawing component includes a first drawing component whose degree of importance is the greatest and a second drawing component whose degree of importance is less than the degree of importance of said first drawing component, and said controller places said first drawing component, said second drawing component, and said decoration component in ascending order of degree of importance from the rear side to the front side of said drawing device when the degree of importance of said second drawing component is greater than the degree of importance of said decoration component.

2. The drawing control device according to claim 1, wherein the degree of importance of said first drawing component is not changeable, and the degree of importance of said second drawing component is changeable, and said controller changes the degree of importance of said second drawing component in accordance with said vehicle state.

3. The drawing control device according to claim 1, wherein the decoration component for decorating said drawing component is an expression of an effect caused by light.

4. The drawing control device according to claim 3, wherein the expression of said effect caused by light is a shadow of said drawing component.

5. The drawing control device according to claim 4, wherein said controller changes darkness of said shadow when receiving change information about the darkness of said shadow.

6. The drawing control device according to claim 4, wherein a plurality of light sources are provided, and said controller draws multiple shadows in accordance with a number of said light sources.

7. The drawing control device according to claim 4, wherein a position of a light source is changeable, and said controller draws said shadow in accordance with the position of said light source.

8. The drawing control device according to claim 7, wherein said light source is placed in a direction in which the sun is estimated to be located in accordance with a position and a traveling direction of said vehicle.

9. The drawing control device according to claim 4, wherein during night, a light source is placed at a predetermined position and said controller draws said shadow in accordance with the position of said light source.

10. The drawing control device according to claim 3, wherein the expression of said effect caused by light is to increase brightness of a portion exposed to said light.

11. The drawing control device according to claim 1, wherein said controller changes the drawing position of said decoration component in accordance with relative positions between an eyepoint of a driver of said vehicle and drawing positions of said drawing object, said drawing component, and said decoration component, which are to be drawn on said drawing device.

12. The drawing control device according to claim 1, wherein said first drawing component is a needle of a meter, said second drawing component is a gauge of said meter, and said decoration component is a shadow of said needle.

13. The drawing control device according to claim 1, wherein said drawing object includes said first drawing component, said second drawing component, and said decoration component.

* * * * *